United States Patent
Lazarus

(10) Patent No.: US 6,711,132 B2
(45) Date of Patent: Mar. 23, 2004

(54) METHOD AND APPARATUS FOR REDUCING END-TO-END DELAY WHEN PROVIDING INTERNET TELEPHONY OVER A CATV CABLE NETWORK

(75) Inventor: David Beryl Lazarus, Elkins Park, PA (US)

(73) Assignee: General Instrument Corporation, Horsham, PA (US)

( * ) Notice: Subject to any disclaimer, the term of this patent is extended or adjusted under 35 U.S.C. 154(b) by 404 days.

(21) Appl. No.: 09/737,307

(22) Filed: Dec. 15, 2000

(65) Prior Publication Data

US 2002/0075865 A1 Jun. 20, 2002

(51) Int. Cl.$^7$ .................................................. H04J 3/06
(52) U.S. Cl. ........................................ 370/236; 370/508
(58) Field of Search ............................ 370/466, 395.43, 370/395.21, 235, 236, 449, 490, 503, 508, 519

(56) References Cited

U.S. PATENT DOCUMENTS

| | | | |
|---|---|---|---|
| 6,011,548 A | 1/2000 | Thacker | 345/327 |
| 6,018,359 A | 1/2000 | Kermode et al. | 348/7 |
| 6,065,049 A | 5/2000 | Beser et al. | 709/218 |
| 6,065,061 A | 5/2000 | Blahut et al. | 709/239 |
| 6,088,569 A | 7/2000 | Bach et al. | 455/3.1 |
| 6,373,817 B1 * | 4/2002 | Kung et al. | |
| 6,442,158 B1 * | 8/2002 | Beser | |
| 6,526,046 B1 * | 2/2003 | Carew | |
| 6,553,568 B1 * | 4/2003 | Fijolek et al. | |
| 2002/0006136 A1 * | 1/2002 | Mallory et al. | |

FOREIGN PATENT DOCUMENTS

WO   WO 00/48420   8/2000   ........... H04Q/11/00

OTHER PUBLICATIONS

Slater, Glen. Media Access Control Protocol Based on DOCSIS 1.1 IEEE, Dec. 22, 1999 http://grouper.ieee.org/groups/802/16/tg1/mac/contrib/802161mc–00_01.pdf, Pp. 257–259.*
Foerster, Jeff "LMDS Standards Architectural Issues" 2000 IEEE, 1590–1594.*
"Interim Specification DOCSIS 1.1".

* cited by examiner

Primary Examiner—Kwang Bin Yao
(74) Attorney, Agent, or Firm—Mayer Fortkort & Williams, PC; Stuart H. Mayer, Esq.; Karin L. Williams, Esq.

(57) ABSTRACT

A method and apparatus is provided for use in providing real-time, packet-switched service to an end-user over a cable data network. The method begins by transmitting over the cable data network a scheduled grant to an end-user gateway in accordance with an unsolicited grant service protocol. The grant authorizes the end-user gateway to transmit a data packet to a cable modem termination system (CMTS) located in the cable data network. Next, an adjustment is made to the time at which subsequent grants are transmitted. The adjustment, which is based on a response of the end-user gateway, is performed to reduce delay between a time when a subsequent data packet is generated and receipt of the subsequent grant.

30 Claims, 1 Drawing Sheet

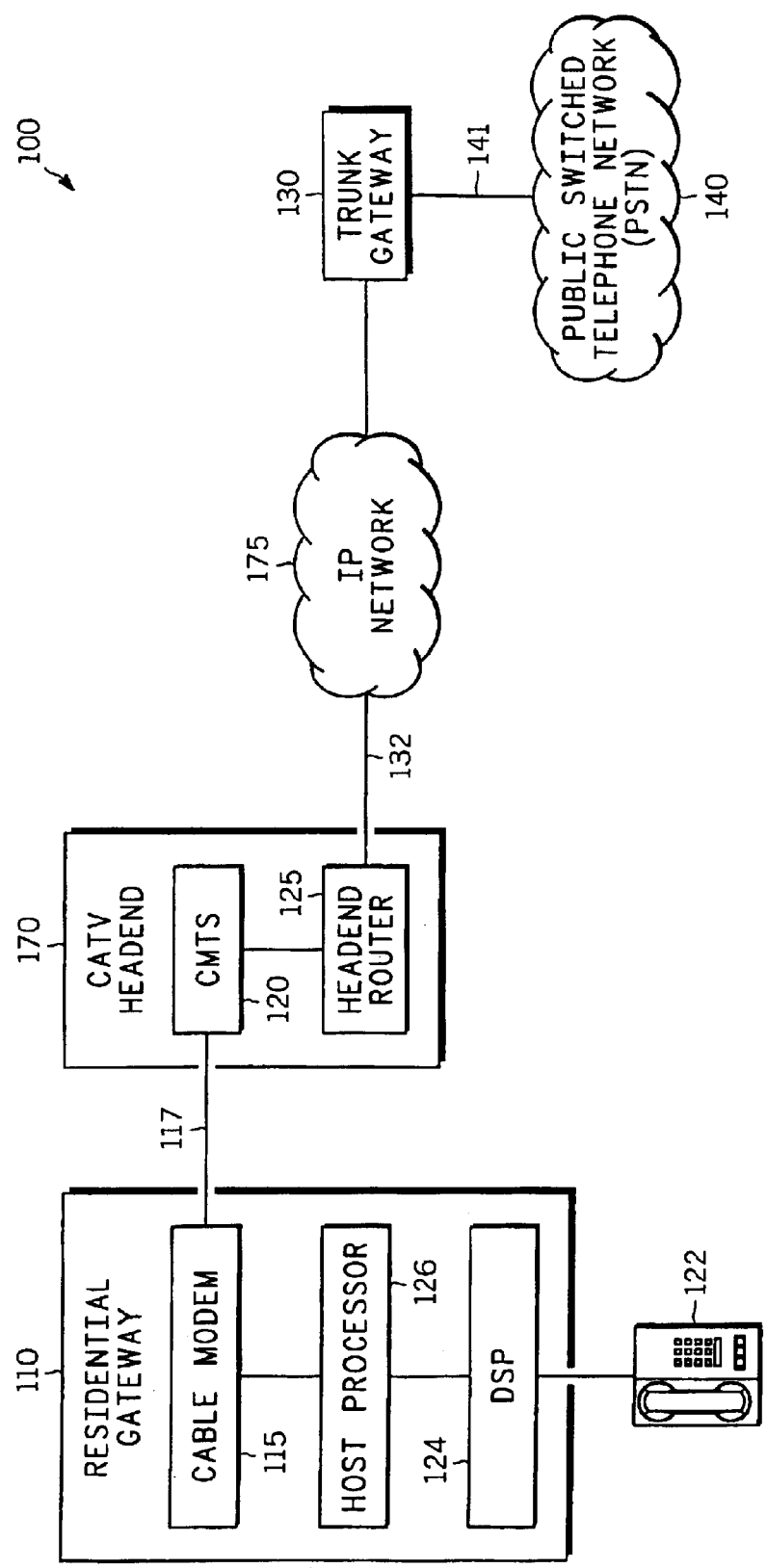

METHOD AND APPARATUS FOR REDUCING END-TO-END DELAY WHEN PROVIDING INTERNET TELEPHONY OVER A CATV CABLE NETWORK

FIELD OF THE INVENTION

This invention relates generally to the provision of real-time services over a packet network, and more particularly to the provision of Internet telephony over a CATV cable network.

BACKGROUND OF THE INVENTION

Today, access to the Internet is available to a wide audience through the public switched telephone network (PSTN). Typically, in this environment, a user accesses the Internet though a full-duplex dial-up connection through a PSTN modem, which may offer data rates as high as 56 thousand bits per second (56 kbps) over the local-loop plant.

However, in order to increase data rates (and therefore improve response time), other data services are either being offered to the public, or are being planned, such as data communications using full-duplex cable television (CATV) modems, which offer a significantly higher data rate over the CATV plant than the above-mentioned PSTN-based modem. Services under consideration by cable operators include packet telephony service, videoconference service, T1/frame relay equivalent service, and many others.

Various standards have been proposed to allow transparent bi-directional transfer of Internet Protocol (IP) traffic between the cable system headend and customer locations over an all-coaxial or hybrid-fiber/coax (HFC) cable network. One such standard, which has been developed by the Cable Television Laboratories, is referred to as Interim Specification DOCSIS 1.1. Among other things, DOCSIS 1.1 specifies a scheme for service flow for real-time services such as packet telephony.

When real-time services are offered over a packet-switched network such as the Internet the delay in transmission between the time the packet is generated by a user at one end point and the time it is received at another endpoint can be problematic. This is particularly true if the real-time service being offered is packet telephony. Individuals can endure upwards of approximately 250 milliseconds of delay during a voice conversation before the conversation becomes awkward. One contribution to the delay is due to the time interval between the time a data packet is generated by the end user and the time it is actually transmitted to the cable system headend. This time interval, which can contribute about 20 milliseconds of delay, arises because of a lack of synchronization between the time when the data is ready to be transmitted and the time when the authorization to transmit is received Accordingly, it would be advantageous to reduce the end-to-end delay when providing real-time packet-switched service over a cable network.

SUMMARY OF THE INVENTION

The present invention provides a method for use in providing real-time, packet-switched service to an end-user over a cable data network. The method begins by transmitting over the cable data network a scheduled grant to an end-user gateway in accordance with an unsolicited grant service protocol. The grant authorizes the end-user gateway to transmit a data packet to a cable modem termination system (CMTS) located in the cable data network. Next, an adjustment is made to the time at which subsequent grants are transmitted. The adjustment, which is based on a response of the end-user gateway, is performed to reduce delay between a time when a subsequent data packet is generated and receipt of the subsequent grant.

In accordance with one aspect of the invention, at least one additional grant, or one pair of additional grants, is transmitted in addition to scheduled grants to reduce the delay.

In accordance with another aspect of the invention, the scheduled grants are transmitted at a nominal grant time and the additional grant is transmitted at a time before the nominal grant time.

In accordance with yet another aspect of the invention, the CMTS receives a data packet in response to the additional grant and another additional grant is transmitted at a time before the initial additional grant is transmitted.

In accordance with another aspect of the invention, the CMTS receives a data packet in response to the additional grant. The data packet includes a queue indicator bit requesting another grant. In addition, a dribble grant is transmitted in response to the queue indicator bit.

In accordance with another aspect of the invention, a cable modem termination system is provided for use in providing real-time packet-switched service to an end-user over a cable data network. The system includes an apparatus for transmitting over the cable data network a scheduled grant to an end-user gateway in accordance with an unsolicited grant service protocol. The grant authorizes the end-user gateway to transmit a data packet to a cable modem termination system (CMTS) in the cable data network. The system also includes an apparatus for adjusting a transmission time of subsequent grants, based on a response of the end-user gateway, to reduce delay between a time when a subsequent data packet is generated and receipt of the subsequent grant.

BRIEF DESCRIPTION OF THE DRAWING

FIG. 1 shows an illustrative data communications system embodying the principles of the invention.

DETAILED DESCRIPTION

An illustrative communications system embodying the principles of the invention is shown in FIG. 1. Other than the inventive concept, the elements shown in FIG. 1 are well known and will not be described in detail.

As noted above, communications system 100 is representative of a network architecture in which a user associated with a residential gateway 110 accesses the Internet 175 and a Public Switched Telephone Network (PSTN) 140. In particular, residential gateway 110 is in communication with the Internet 175 via a CATV network. Cable TV network access is provided by an MSO (Multi-Service Operator) (not shown). In this context, it is assumed the MSO provides (besides the traditional CATV access network facilities exemplified by communications link 117) CATV head-end 170 and cable modem 115. This CATV network arrangement is also referred to herein as a cable data network. CATV network is typically an all-coaxial or a hybrid-fiber/coax (HFC) cable network. Residential gateway 110 is also in communication with PSTN 140 via the cable TV network, IP network 175, and trunk gateway 130.

Residential gateway 110 includes customer premises equipment 122, e.g., a telephone, a Digital Signal Processor (DSP) 124, host processor 126 and Cable Modem (CM) 115. Telephone 122, DSP 124, and host processor 126 are collectively representative of data terminal equipment, which is coupled to communications link 117 via CM 115. CM 115 provides the access interface to the cable data network. In operation, DSP 124 generates data packets from the analog signals received from the telephone 122. Typically, DSP 124 encodes the data with pulse code modulated samples digitized at a rate of 8 kHz. Host processor 126 receives the data packet from the DSP 124 and adds an appropriate header, such as required by the MAC, IP, and UDP layers. Once the packet is complete, it is sent to CM 115, where it remains in a queue until it is transmitted over the cable data network to the CMTS 120 in the CATV headend 170. For the purposes of the present invention, the service being provided is assumed to be a real-time service such as packet telephony. Accordingly, the data packets should be formatted in accordance with a suitable protocol such as the Real-Time Transport Protocol (RTP).

An Internet Service Provider (ISP) provides Internet access. In the context of FIG. 1, it is assumed an ISP provides IP network 175, which includes a cable data network access router (not shown) attached to communications link 132. It should be noted that for illustrative purposes only it is assumed that the above-mentioned MSO and ISP Service provider are different entities even though this is not relevant to the inventive concept.

CM 115 is coupled to CATV head-end 170 via cable facility 117, which is, e.g., a CATV radio-frequency (RF) coax drop cable and associated facilities. CATV head-end 170 provides services to a plurality of downstream users (only one of which is shown) and comprises cable modem data termination system (CMTS) 120 and head-end router 125. (CMTS 120 may be coupled to head-end router 125 via an Ethernet 100BaseX connection (not shown).) CMTS 120 terminates the CATV RF link with CM 115 and implements data link protocols in support of the residential service that is provided. Given the broadcast characteristics of the RF link, multiple residential customers and, hence, potentially many home-based LANs may be serviced from the same CMTS interface. (Also, although not shown, it is assumed that the CATV network includes a plurality of CMTS/head-end router pairs.)

CM 115 and CMTS 120 operate as forwarding agents and also as end-systems (hosts). Their principal function is to transmit Internet Protocol (IP) packets transparently between the CATV headend and the customer location. Interim Specification DOCSIS 1.1 has been prepared by the Cable Television Laboratories as a series of protocols to implement this functionality. In accordance with section 8.2 of DOCSIS 1.1, the upstream, i.e., from the residential gateway 110 to the headend 170, service flow for real-time service is provided by a scheduling service referred to as Unsolicited Grant Service (UGS). In this scheme, CM 115 generates and formats RTP packets at fixed intervals and the CMTS 120 provides opportunities for the CM 115 to transmit the RTP packets at the same fixed intervals. CMTS 120 provides these transmission opportunities in the form of grants, which are transmitted to the CM 115 on a periodic basis. The grants in effect authorize the CM 115 to transmit the RTP packets upstream to the CMTS 120. The parameters specified by the grant include the size of the packet to be transmitted, the nominal grant interval, and the maximum tolerable jitter.

As previously mentioned, when offering real-time services such as packet telephony it is important to minimize the total end-to-end delay. One way to reduce delay is to synchronize the generation of the RTP packets with the arrival of grants from the CMTS 120. In this way the number of packets maintained in the queue of CM 115 can be kept to a minimum. Of course, because of variations in the CM and CMTS, a slight margin must be allowed to accommodate worst case jitter and thus some minimal delay should be retained between the time the RTP packets are generated and when the grants arrive at the CM. The earliest time at which a grant may be transmitted by the CMTS so that it arrives when a packet is ready is known as the nominal grant time. To date, most proposed solutions for achieving synchronization require the CM 155 to adjust the CMTS 120. More specifically, the proposed solutions require the CM to determine the nominal grant time either by explicit notification or by measuring the grant arrival times. Once the CM has determined the nominal grant time, the CM must adjust the DSP so that the packets are generated at the proper time.

One problem with the proposed solutions is that it is difficult for the CM to adjust the DSP sample collection and processing steps so that it is synchronized with the nominal grant time. To perform this synchronization, the CM must accurately predict or estimate the DSP imposed delay. This will be a complex task when the DSP is processing several calls concurrently, particularly when each call uses a different vocoder and packetization period. Other complications arise when voice samples are captured and processed outside the CM in a Multimedia Telephony Adapter (MTA) and routed through the CM via a Local Area Network (LAN). In this case, the CM must synchronize the collection and processing of voice samples within the MTA so that the data arrives via the LAN just in time to match the UGS grants. This becomes an even more difficult problem of estimation because the MTA has all same complications that arise in connection with the DSP along with the additional complication of predicting the delay and jitter inserted by the LAN. Since each LAN technology will behave differently, any estimate must take into account the particular LAN technology being employed and the specific LAN timing.

To overcome these difficulties, the present invention requires the CMTS rather than the CM to make any adjustments that are needed to achieve synchronization. As before, the CMTS establishes the unsolicited grant service by transmitting grants at regular intervals and the CM transmits a packet upon receiving the grant. However, the CMTS now determines if it is properly synchronized with the CM. This is accomplished by adjusting the nominal grant time so that it occurs earlier in time. The nominal grant time is adjusted earlier and earlier until it arrives at the CM just when a packet has arrived in the que and is ready to be transmitted. That is, in the present invention, the CMTS schedules grants to accommodate the CM.

The CMTS achieves synchronization by transmitting additional grants beyond those that are regularly scheduled. The additional grants effectively serve as experimental grants to determine the earliest possible grant time. If the CM queue contains untransmitted packets, they will be transmitted in response to the additional grants, thus indicating that the nominal grant time is not as early as possible. On the other hand, if the grant was transmitted too early, the CM will not transmit a packet because preparation of the packet was not yet complete. In other words, if the CMTS does not receive a packet in response to an additional grant, the additional grant was transmitted too early. Based on the response from the CM, the CMTS adjusts the time at which it transmits subsequent grants to achieve synchronization.

The timing of the additional grants may be selected in a variety of different ways. For example, in one approach, the CMTS conducts an experiment by transmitting two additional grants, one earlier and one later than the current nominal grant time. If the CM transmits a packet in response to the earlier of the two additional grants, the nominal grant time can be adjusted to the time at which the earlier grant was sent. If instead the CM transmits a packet in response to the later of the two additional grants, then the earlier additional grant was sent too early. Accordingly, another experiment should be conducted by sending another pair of additional grants on a less aggressive schedule. That is, the earlier grant in this subsequent pair of grants should be sent at a time later than the previous earlier additional grant (but still earlier than the current grant time). The later of the pair of grants in effect serves as a backup grant to ensure that a grant will be available for any packet that may be in the CM que.

The CMTS may continue to conduct such a series of experiments in this manner until the earliest acceptable nominal grant time has been determined. These experiments may be conducted in accordance with a methodical approach to achieve optimal synchronization. For example, an iterative approach such as a binary search scheme may be used. That is, the CMTS can continuously refine the nominal grant time by adjusting the timing of additional grants based on the response received from the previous additional grant. For instance, if a packet was transmitted in response to the previous additional grant, the next additional grant can be transmitted even earlier in time. In accordance with a binary search scheme, this subsequent grant should be transmitted at a time halfway between the packetization period and the time of the last successfully received grant. If this subsequent grant should fail (i.e., if the CM should not transmit a packet in response to the grant), an additional grant should be transmitted at a time halfway between the time of the earliest successful additional grant and the last failed additional grant. By repeating this process a number of times the earliest acceptable nominal grant time can be determined, thus achieving optimal synchronization. Typically, four to six iterations are expected to suffice. One advantage of conducting the experiment in this manner with a pair of grants is that packets will not be lost as a result of the experiment.

Instead of sending a pair of additional grants, the CMTS may transmit a single additional grant per experiment. In other words, in contrast to the previously described approach, the CMTS transmits the earlier grant but not the later backup grant. In this case, if the additional grant was received too early, the next time the CM transmits a packet it will include a queue indicator bit in its header. The queue indicator bit requests that the CMTS transmit an additional grant to compensate for the lost grant which was received too early. Upon receiving the queue indicator bit, the CMTS can once again conclude that the additional grant was transmitted too early and adjust the grant interval accordingly. In response to receipt of the queue indicator bit, a so-called dribble grant may be transmitted by the CMTS as specified in DOCSIS 1.1. The dribble grant in effect serves as a backup grant. However, by waiting to receive a queue bit indicator before transmitting a dribble grant, packets are delayed in the CM queue and thus jitter may be introduced. One advantage of this procedure over the previously mentioned procedure in which a pair of grants is sent is that it employs a mechanism, i.e., the queue indicator bit and the dribble grant to which the CMTS is already programmed to respond. Accordingly, in some cases this procedure may be simpler to implement in already existing systems than a procedure that employs a pair of additional grants.

After the CMTS determines a new nominal grant time, it adjusts its grant schedule accordingly. The CMTS may maintain this new grant schedule until it receives a request for a dribble grant from the CM, which indicates that proper synchronization has been lost. At this point the CMTS repeats the inventive synchronization procedure to determine a new, more optimized grant schedule.

In addition to the detection of a request for a dribble grant, the CMTS may also try to anticipate changes in synchronization in other ways. For example, a dynamic service change in the service flow is likely indicative of a change in synchronization. Dynamic service changes include a change in packet size, grant time, or the addition or subtraction of a party to the service.

Although various embodiments are specifically illustrated and described herein, it will be appreciated that modifications and variations of the invention are covered by the above teachings and are within the purview of the appended claims without departing from the spirit and intended scope of the invention. For example, while the invention has been described in terms of packet telephony service, one of ordinary skill in the art will recognize that the invention is equally applicable to the provision of other real-time services such as video conferencing, for example. Moreover, while the invention has been described in the context of unsolicited grant service in accordance with DOCSIS 8.2.1, the invention is also applicable to unsolicited grant service with activity detection in accordance with DOCSIS 8.2.3. This service is designed to support real-time services that may become inactive for substantial portions of time, such as often occurs with packet telephony.

What is claimed is:

1. A method for use in providing real-time, packet-switched service to an end-user over a cable data network, said method comprising the steps of:

transmitting over the cable data network a scheduled grant to an end-user gateway in accordance with an unsolicited grant service protocol, said grant authorizing the end-user gateway to transmit a data packet to a cable modem termination system (CMTS) in the cable data network;

adjusting a transmission time of subsequent grants, based on a response of the end-user gateway, to reduce delay between a time when a subsequent data packet is generated and receipt of the subsequent grant; and transmitting at least one additional grant in addition to scheduled grants to reduce said delay, wherein the CMTS receives a data packet in response to the additional grant, said data packet including a queue indicator bit reguesting another grant and further comprising the step of transmitting a dribble grant in response thereto.

2. The method of claim 1 further comprising the step of transmitting at least one pair of additional grants in addition to scheduled grants to reduce said delay.

3. The method of claim 2 wherein said scheduled grants are transmitted at a nominal grant time and wherein a first of said pair of additional grants is transmitted at a time before said nominal grant time and a second of said pair is transmitted at a time after said nominal grant time.

4. The method of claim 1 wherein said scheduled grants are transmitted at a nominal grant time and wherein said additional grant is transmitted at a time before said nominal grant time.

5. The method of claim 1 further comprising the step of transmitting another additional grant at a time before said additional grant was transmitted.

6. The method of claim 1 wherein the transmitting step is performed in accordance with an iterative search scheme.

7. The method of claim 8 wherein said iterative search scheme is a binary search scheme.

8. The method of claim 1 wherein said packet-switched service is Internet service.

9. The method of claim 8 wherein said real-time Internet service is packet telephony.

10. The method or claim 1 wherein said data packet is a Real-Time Transport Protocol (RTP) packet.

11. A method of synchronizing the generation of data packets to be transmitted upstream over a cable data network with the arrival of grants authorizing an end-user gateway to transmit the data packet, said method comprising the steps of:

transmitting over the cable data network scheduled grants at prescribed grant times to the end-user gateway in accordance with an unsolicited grant service protocol;

adjusting the prescribed grant times, based on a response of the end-user gateway, to reduce delay between a time when a subsequent data packet is generated and receipt of a subsequent grant;

transmitting at least one additional grant in addition to scheduled grants to reduce said delay; and receiving a data packet in response to the additional grant, said data packet including a queue indicator bit requesting another grant and further comprising the step of transmitting a dribble grant in response thereto.

12. The method of claim 11 further comprising the step of transmitting at least one pair of additional grants in addition to scheduled grants to reduce said delay.

13. The method of claim 11 wherein said additional grant is transmitted at a time before said scheduled grant time.

14. The method of claim 11 wherein a first of said pair of additional grants is transmitted at a time before said scheduled grant time and a second of said pair is transmitted at a time after said scheduled grant time.

15. The method of claim 11 further comprising the steps of receiving a data packet in response to the additional grant and transmitting another additional grant at a time before said additional grant was transmitted.

16. The method of claim 11 wherein the transmitting step is performed in accordance with an iterative search scheme.

17. The method of claim 16 wherein said iterative search scheme is a binary search scheme.

18. The method of claim 11 wherein said data packets are employed in a packet-switched service offered over said cable data network.

19. The method of claim 18 wherein said packet-switched service is Internet service.

20. The method of claim 19 wherein said real-time Internet service is packet telephony.

21. The method of claim 11 wherein said data packet is a Real-Time Transport Protocol (RTP) packet.

22. A cable modem termination system (CMTS) for use in providing real-time packet-switched service to an end-user over a cable data network, said system comprising:

means for transmitting over the cable data network a scheduled grant to an end-user gateway in accordance with an unsolicited grant service protocol, said grant authorizing the end-user gateway to transmit a data packet to the cable modem termination system (CMTS) in the cable data network; and means for adjusting a transmission time of subsequent grants, based on a response of the end-user gateway, to reduce delay between a time when a subsequent data packet is generated and receipt of the subsequent grant, wherein said transmitting means transmits at least one pair of additional grants in addition to scheduled grants to reduce said delay, and wherein a data packet is received in response to the additional grant, said data packet including a queue indicator bit requesting another grant and said transmitting means transmits a dribble grant in response thereto.

23. The cable modem termination system of claim 22 wherein said scheduled grants are transmitted at a nominal grant time and wherein said additional grant is transmitted at a time before said nominal grant time.

24. The cable modem termination system of claim 22 wherein said scheduled grants are transmitted at a nominal grant time and wherein a first of said pair of additional grants is transmitted at a time before said nominal grant time and a second of said pair is transmitted at a time after said nominal grant time.

25. The cable modem termination system of claim 22 wherein a data packet is received in response to the additional grant and said transmitting means transmits another additional grant at a time before said additional grant was transmitted.

26. The cable modem termination system of claim 22 wherein said transmitting means transmits said additional grant in accordance with an iterative search scheme.

27. The cable modem termination system of claim 26 wherein said iterative search scheme is a binary search scheme.

28. The cable modem termination system of claim 22 wherein said packet-switched service is Internet service.

29. The cable modem termination system of claim 28 wherein said real-rime Internet service is packet telephony.

30. The cable modem termination system of claim 22 wherein said data packet is a Real-Time Transport Protocol (RTP) packet.

* * * * *

UNITED STATES PATENT AND TRADEMARK OFFICE
CERTIFICATE OF CORRECTION

PATENT NO. : 6,711,132 B2
DATED : March 23, 2004
INVENTOR(S) : Lazarus

It is certified that error appears in the above-identified patent and that said Letters Patent is hereby corrected as shown below:

Column 4,
Line 33, change "MTA has all same" to -- MTA has all the same --.
Line 49, change "que" to -- queue --.

Column 5,
Line 16, change "que" to -- queue --.

Column 7,
Line 3, change "The method of claim 8" to -- The method of claim 6 --.
Line 9, change "The method or claim" to -- The method of claim --.

Signed and Sealed this

Tenth Day of August, 2004

JON W. DUDAS
*Acting Director of the United States Patent and Trademark Office*